(No Model.)

M. POTTER.
CAR STARTER.

No. 320,088. Patented June 16, 1885.

Witnesses.
E. H. Finckel.
S. R. Brashears.

Inventor.
Mark Potter,
by his attorney
Wm. H. Finckel.

UNITED STATES PATENT OFFICE.

MARK POTTER, OF SYRACUSE, NEW YORK.

CAR-STARTER.

SPECIFICATION forming part of Letters Patent No. 320,088, dated June 16, 1885.

Application filed March 9, 1885. (No model.)

*To all whom it may concern:*

Be it known that I, MARK POTTER, a citizen of the United States, residing at Syracuse, in the county of Onondaga and State of New York, have invented certain new and useful Improvements in Car-Starters, of which the following is a full, clear, and exact description.

This invention relates to means for giving a forward movement to a car as an auxiliary to and concurrently with the pull of the draft animal in starting, such devices being commonly termed "car-starters."

The invention consists in a weighted lever or dog connected with the draw-bar and acting on a forward movement of said bar upon a fixed member (such as a drum or ratchet) of the axle to rotate such axle and its affixed wheels to aid in starting the car, to thus overcome or assist in overcoming inertia, and thereby lightening the draft at the start, the weighting of the lever effecting the automatic return of the lever when the car stops to be ready for action in assisting the next start, all as I will now proceed to specify and claim.

Figure 1:
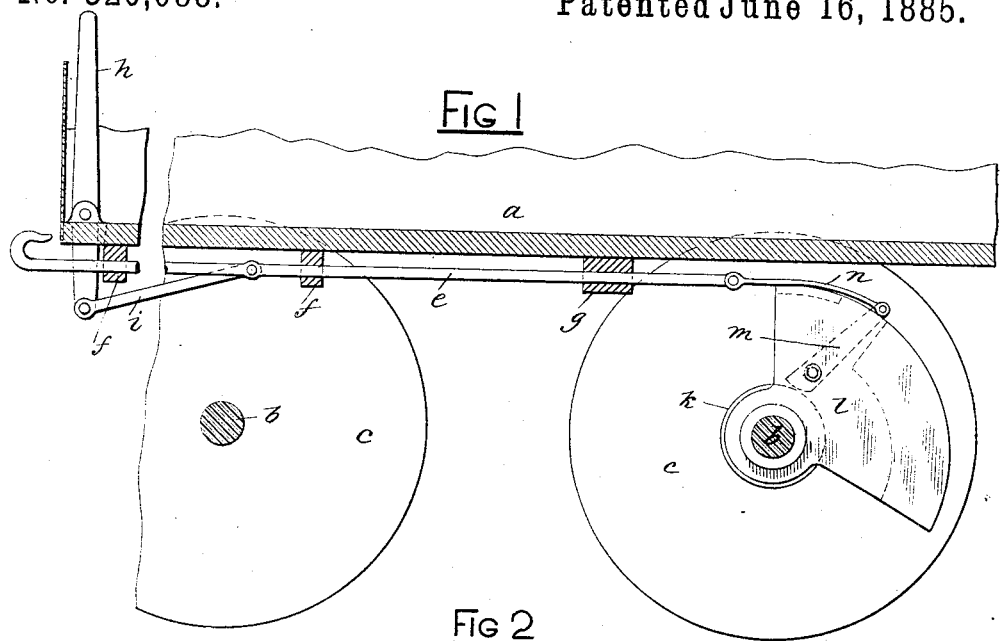
Figure 2:
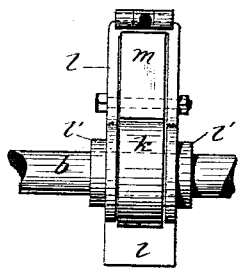

In the accompanying drawings, in the several figures of which like parts are similarly designated, Figure 1 is a vertical section taken in a plane between the observer and the center of the car, of sufficient of a car equipped with my starter to illustrate it. Fig. 2 is a front elevation of the lever and drum, and Fig. 3 is a vertical section of a modification.

$a$ is a part of the car-body; $b\ b$, the axles; $c\ c$, the wheels fixed thereon, and $e$ is a draw-bar supported in guide-blocks or hangers $f\ f$ $g$, attached to the bottom of the car and extending to the rear axle. This draw-bar has a longitudinal movement in its guides, and as an auxiliary for operation by hand I provide a lever, $h$, fulcrumed in the front platform of the car and connected by a link, $i$, to said draw-bar, so that the driver may assist the draft-animal in starting the car and also have control of the starter.

Figure 3:
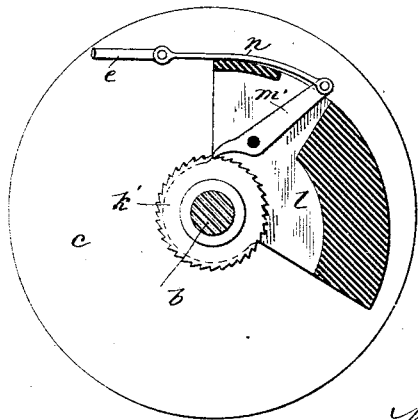

On the rear axle is fixed a drum, $k$, Figs. 1 and 2, or ratchet $k'$, Fig. 3, and straddling this and loosely secured to the axle, so as to turn freely thereon, is a lever composed of a weight, $l$, and dog or pawl $m$ or $m'$, pivoted therein and having its active face eccentric with respect to the drum or ratchet, so as to engage the same for a given distance and then slip out of contact therewith. The draw-bar and dog or pawl are connected by a link, $n$. In Figs. 1 and 2 contact is made between the dog and drum by friction of parts, while in Fig. 3 the pawl positively engages the teeth of the ratchet to rotate the axle as the draft is applied to the draw-bar. The forward movement of the draw-bar is arrested by the link $n$ coming in contact with the guide $g$, which latter thereby acts as a stop. When the forward pull on the draw-bar is made, the dog or pawl engages the drum or ratchet and turns the axle till the eccentricity of the dog or pawl causes it to leave the drum or ratchet, and so permits the axle to run free. When the car stops, the weight $l$ will return the pawl or dog to the position shown, ready for a fresh start.

Instead of connecting the draw-bar to the dog or pawl, it may be attached to the weight, in which event the dog or pawl may terminate just above its pivot.

My weight may consist of a segmental hollow casting having sides which terminate in collars $l'$, which encircle the axle, and it may be applied to the axle by placing the drum or ratchet in the hollow between its sides, and then aligning them and slipping them on the axle into position, after which the drum or ratchet is fixed to the axle by a key or set-screw, or otherwise.

The dog or pawl, when connected to the draw-bar, projects up through a slot in the weight, and is by said slot limited as to its movement.

What I claim is—

1. In a car-starter, a draw-bar, and a weighted lever, $l$, connected to it so as to be drawn forward by it and return automatically, and carrying a dog or pawl to engage a fixed member on the axle, to rotate said axle in the forward movement of the draw-bar, substantially as set forth.

2. In a car-starter, a draw-bar, and a weighted lever connected to it so as to be drawn forward by it and returned automatically, and carrying a dog or pawl to engage a fixed member on the axle to rotate said axle in the forward movement of the draw-bar, combined with an auxiliary hand-operating mechanism for said draw-bar, substantially as set forth.

3. The weight $l$, loose on the axle and provided with the dog $m$, a friction-drum interposed between said dog and the axle, and the draft-bar connected in a right line by a link to said dog, substantially as described.

In testimony whereof I have hereunto set my hand this 7th day of March, A. D. 1885.

MARK POTTER.

Witnesses:
JUDSON N. KNAPP,
F. R. SMITH.